Patented Jan. 8, 1952

2,581,932

UNITED STATES PATENT OFFICE 2,581,932

TETRAHYDROBENZOTHIAZOLE SULFENAMIDES

George E. P. Smith, Jr., Akron, Ohio, assignor to The Firestone Tire & Rubber Company, Akron, Ohio, a corporation of Ohio No Drawing. Application January 12, 1950, Serial No. 138,266

5 Claims. (Cl. 260—302)

This invention relates to a new class of accelerators of the vulcanization of rubber or rubber-like substances.

As a part of the present invention, it has been discovered that members of a new class of chemical compounds are very effective in accelerating the vulcanization of natural or synthetic rubber. The new compounds are sulfenamides of the following general formula:

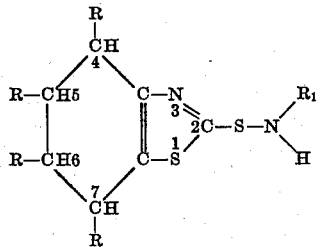

wherein R is hydrogen, an alkyl radical or an alkoxy radical, and $R_1$ is a hydrogen atom, an alkyl radical, or a cyclo-alkyl radical. Examples of alkyl radicals include methyl, ethyl, propyl, butyl, amyl, hexyl, heptyl, octyl, decyl, lauryl, benzyl, and similar radicals. Examples of cyclo-alkyl radicals include cyclohexyl and methyl-cyclohexyl radicals.

Examples of compounds of the invention include: N - cyclohexyl - tetrahydrobenzothiazole sulfenamide; N-isopropyl tetrahydrobenzothiazole sulfenamide; N-benzyl-(5-methyl-tetrahydrobenzothiazole) sulfenamide; N - methyl - (5-ethyl - tetrahydrobenzothiazole) sulfenamide; N - lauryl - (4 - ethyl - tetrahydrobenzothiazole sulfenamide; tetrahydrobenzothiazole sulfenamide; N-sec. amyl-tetrahydrobenzothiazole sulfenamide; N-benzyl-tetrahydrobenzothiazole sulfenamide; N-ethyl-tetrahydrobenzothiazole sulfenamide; N-butyl-tetrahydrobenzothiazole sulfenamide; N-methyl-tetrahydrobenzothiazole sulfenamide; N - cyclohexyl - (7 - methyl - tetrahydrobenzothiazole) sulfenamide; and N-isopropyl-(6-ethyl-tetrahydrobenzothiazole) sulfenamide.

The following detailed examples are given for illustrative purposes only:

Example 1

Preparation of the new compound, N-cyclohexyl-tetrahydrobenzothiazole sulfenamide, was accomplished according to the following series of reactions:

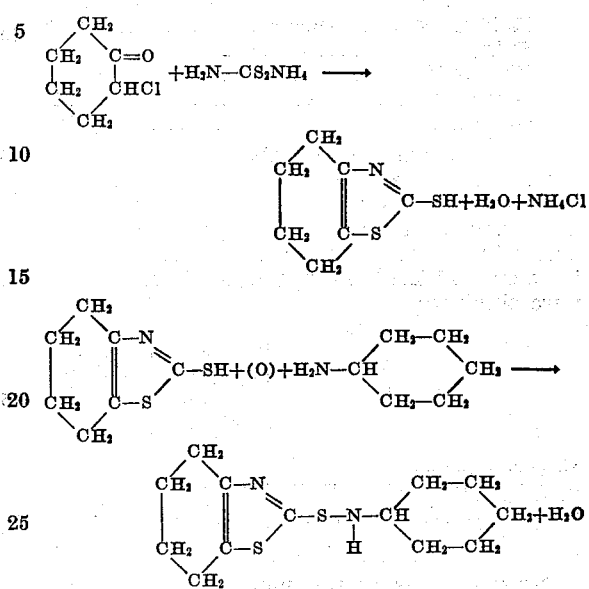

The intermediate product, 2-mercapto-tetrahydrobenzothiazole, was prepared by adding 14.4 grams of 2-chlorocyclohexanone to 12.0 grams of freshly prepared ammonium dithiocarbamate, together with a little ether. The reaction was not violent, and the mixture was allowed to stand 15 hours at room temperature. The ether was removed by evaporation, leaving a brown solid. On extracting this solid with boiling benzene there were obtained 6.8 grams of the mercaptan. On recrystallizing the product from benzene a white solid was obtained melting at 174–176° C.

The sulfenamide was prepared by oxidizing with iodine (in aqueous potassium iodide) an aqueous solution containing 10.0 grams of the mercaptan (prepared as above), 4.6 grams of sodium hydroxide and 23.0 grams (4 moles per mole of mercaptan) of cyclohexylamine. The mixture was stirred strongly and cooled to 5–10° C. during the reaction. A light tan precipitate of the N - cyclohexyl - tetrahydrobenzothiazole sulfenamide was produced weighing 9.7 grams, a yield of 62%. A portion of the sulfenamide recrystallized from a mixture of ether and petroleum ether was a white solid melting at 100–103° C.

*Example 2*

N - isopropyl - tetrahydrobenzothiazole sulfenamide was prepared in a similar manner from 8.0 grams of 2-mercapto-tetrahydrobenzothiazole (prepared as in Example 1) and a large excess (15–20 moles per mole of the mercaptan) of isopropylamine. The mixture of reagents was oxidized in cold aqueous alkaline solution by the dropwise addition of iodine-potassium iodide solution and agitation of the reaction mixture. The desired sulfenamide precipitated as a yellow solid, which was separated from the reaction mixture after no further precipitation occurred on adding further iodine solution. The solid product melted to a light yellow oil on warming to room temperature. The sulfenamide was obtained in a yield of 5.7 grams or 53% of the theoretical.

The sulfenamides prepared according to Examples 1 and 2 were tested as rubber vulcanization accelerators by comparing them to the standard accelerator, mercaptobenzothiazole, in the following rubber formula:

| Ingredients: | Parts by weight |
|---|---|
| Rubber (smoked sheets) | 100.00 |
| Sulfur | 3.00 |
| Zinc oxide | 5.00 |
| Stearic acid | 1.10 |
| Accelerator | 0.75 |

Samples of the three rubber compositions, so formulated, were heated for 30 minutes at 240° F. to determine whether or not they possessed any tendency to pre-vulcanize or set-up during processing operations prior to the usual vulcanizing step, and the following physical testing data were obtained:

| Accelerator | Modulus of Elasticity in lbs./in.$^2$ at elongation of 600% | Tensile Strength in lbs./in.$^2$ at break |
|---|---|---|
| Mercaptobenzothiazole | 400 | 2250. |
| N-Cyclohexyl-tetrahydrobenzothiazole sulfenamide | no cure | no cure. |
| N-Isopropyl-tetrahydrobenzothiazole sulfenamide | do | Do. |

Other samples of the same rubber compositions were heated for 20, 40 and 60 minutes at 280° F. to test the accelerating ability of the sulfenamides at a conventional rubber vulcanizing temperature, and the following data resulted:

| | Modulus of Elasticity in lbs./in.$^2$ at Elongation of 600% | | | Tensile Strength in lbs./in.$^2$ at break | | |
|---|---|---|---|---|---|---|
| Accelerator; Minutes | 20 | 40 | 60 | 20 | 40 | 60 |
| Mercaptobenzothiazole | 650 | 650 | 600 | 2,550 | 2,700 | 2,750 |
| N-Cyclohexyl-tetrahydrobenzothiazole sulfenamide | 1,100 | 1,950 | 2,050 | 3,275 | 3,300 | 3,775 |
| N-Isopropyl-tetrahydrobenzothiazole sulfenamide | 825 | 1,350 | 1,375 | 2,900 | 3,350 | 3,350 |

The two sets of testing data given above show that the sulfenamides tested are excellent delayed-action accelerators, since the rubber compositions containing them did not vulcanize at the relatively low vulcanizing temperature of 240° F. (which is often reached during factory processing of a rubber composition), in contrast with the composition including the standard accelerator, mercaptobenzothiazole. Furthermore, the new accelerators imparted very high physical properties to the rubber compositions after the relatively short cure of 20 minutes at 280° F., in comparison with mercaptobenzothiazole, and the physical properties were even higher after the longer heating periods.

Other members of the preferred group of sulfenamides coming under the general formula set out above, such as, for example, those specific sulfenamides enumerated above, are also safe, delayed-action accelerators which produce very rapidly vulcanizing rubber compositions.

*Example 3*

N-sec.-Amyl-tetrahydrobenzothiazole sulfenamide was prepared by iodine oxidation at room temperature (20–25° C.) of an alkaline aqueous mixture containing sec.-amylamine (2-aminopentane) and 2-mercapto-tetrahydrobenzothiazole in the ratio of 5 moles of amine to 1 mole of mercaptan. The desired sulfenamide was isolated as a brown oil, which was found by analysis to contain 10.7% of nitrogen, as compared with a value of 10.9% calculated from the formula $C_{12}H_{20}N_2S_2$. This new sulfenamide was tested as a rubber vulcanization accelerator and found to be an efficient delayed-action accelerator of the same character as the sulfenamides of Examples 1 and 2.

*Example 4*

N-benzyl-tetrahydrobenzothiazole sulfenamide was prepared in accordance with the procedure of Example 3, the reagent amine in this case being benzylamine. The desired sulfenamide was obtained as a brown oil, which was found by analysis to contain 9.9% of nitrogen, as compared with a value of 10.1% calculated from the formula $C_{14}H_{16}N_2S_2$. The new sulfenamide was tested as a rubber vulcanization accelerator and found to be an efficient delayed-action accelerator of the same character as the sulfenamides of Examples 1, 2 and 3.

The various members of the new class of chemical compounds are equally effective delayed-action vulcanization accelerators in rubber tread compounds, latex compounds or other conventional types of vulcanizable compounds of rubber, reclaimed rubber, or synthetic rubber, and consistently produce rapid-curing compositions, which in the vulcanized state possess unusually high modulus, tensile and abrasion-resisting properties. The various synthetic rubbers vulcanizable by heating with sulfur are herein considered equivalent to rubber, examples being butadiene polymers, isoprene polymers and various interpolymers of conjugated diolefins and vinyl compounds, such as GR–S (copolymer of butadiene and styrene) and GR–A (copolymer of butadiene and acrylonitrile). Although sulfur has hereinabove been mentioned as the preferred vulcanizing agent, other known vulcanizing agents susceptible to acceleration are contemplated.

The preferred class of sulfenamide derivatives may be prepared by other methods than those mentioned above. For example, a mixture of a 2-mercapto-tetrahydrobenzothiazole and ammonia or a suitable primary amine may be oxidized by hydrogen peroxide or other oxidizing agent, such as chlorine, bromine, hypochlorites or other hypohalites. The invention is not limited to derivatives prepared in accordance with any particular method, but includes the preferred class of compounds, however they may have been formed.

In addition to the above-enumerated desirable properties imparted by the new accelerators to rubber compositions, it has been found that the vulcanized compositions also are highly efficient, having low hysteresis characteristics. When compared to conventionally accelerated vulcanized rubber compositions, the new compositions are found to be unusually resistant to deterioration upon flexing or aging.

Conventional accelerator activators may be employed to an advantage with the new class of accelerators when extremely rapid vulcanization is desired, especially at lower temperatures. Also, the new accelerators may be used in combination with other accelerators, such as guanidine (e. g., diphenyl guanidine) or a conventional mercaptothiazole derivative (e. g., mercaptobenzothiazole or dibenzothiazyl disulfide), in order to produce rubber compositions having especially rapid or specific vulcanizing properties. The new accelerators may be employed in other proportions than the proportion shown, but will normally be utilized in the range of 0.1 to 10 parts per 100 parts of rubber.

In addition to utility in vulcanizing rubber, the compounds of the invention have potential utility in fungicides, insecticides, etc. This application is a continuation-in-part of my application Serial No. 530,393, filed April 10, 1944, now Patent No. 2,514,208.

What is claimed is:

1. N-cyclohexyl-tetrahydrobenzothiazole sulfenamide.

2. N-isopropyl-tetrahydrobenzothiazole sulfenamide.

3. A sulfenamide of the formula

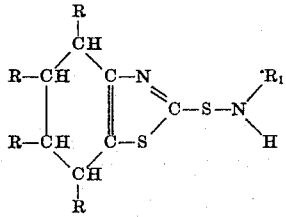

wherein R is a member of the group consisting of hydrogen, alkyl radicals and alkoxy radicals, and $R_1$ is selected from the group consisting of hydrogen, alkyl radicals, the benzyl radical and cycloalkyl radicals.

4. N-sec.-amyl-tetrahydrobenzothiazole sulfenamide.

5. N-benzyl-tetrahydrobenzothiazole sulfenamide.

GEORGE E. P. SMITH, JR.

REFERENCES CITED

The following references are of record in the file of this patent:

UNITED STATES PATENTS

| Number | Name | Date |
|---|---|---|
| 2,191,657 | Harman | Feb. 27, 1940 |
| 2,316,250 | Jones | Apr. 13, 1943 |
| 2,392,935 | Mathes | Jan. 15, 1946 |